United States Patent
Goto

(10) Patent No.: US 9,838,952 B2
(45) Date of Patent: Dec. 5, 2017

(54) COMMUNICATION DEVICE, CONTROL METHOD THEREFOR, AND PROGRAM

(71) Applicant: CANON KABUSHIKI KAISHA, Tokyo (JP)

(72) Inventor: Fumihide Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 14/975,446

(22) Filed: Dec. 18, 2015

(65) Prior Publication Data

US 2016/0105842 A1    Apr. 14, 2016

Related U.S. Application Data

(63) Continuation of application No. 14/151,981, filed on Jan. 10, 2014, which is a continuation of application
(Continued)

(30) Foreign Application Priority Data

Mar. 11, 2009   (JP) ................................. 2009-058268

(51) Int. Cl.
*H04L 12/24* (2006.01)
*H04L 12/751* (2013.01)
*H04L 12/18* (2006.01)
*H04L 12/761* (2013.01)
*H04W 48/16* (2009.01)
*H04W 24/02* (2009.01)
*H04W 84/12* (2009.01)

(52) U.S. Cl.
CPC ........... *H04W 48/16* (2013.01); *H04W 24/02* (2013.01); *H04W 84/12* (2013.01)

(58) Field of Classification Search
CPC ....... H04L 41/12; H04L 45/02; H04L 12/185; H04L 45/16

USPC .......................................................... 370/338
See application file for complete search history.

(56) References Cited

U.S. PATENT DOCUMENTS 6,842,460 B1    1/2005 Olkkonen
2002/0085516 A1*  7/2002 Bridgelall ............. H04W 36/04
                                                     370/329
2007/0249323 A1* 10/2007 Lee et al. ................. G06F 21/33
                                                     455/411

FOREIGN PATENT DOCUMENTS

JP    2006-287600 A    10/2006
JP    2010-213087 A     9/2010
WO    2007/005331 A2    1/2007

OTHER PUBLICATIONS

Wi-Fi Certified (TM) for Wi-Fi Protected Setup: Easing the User Experience for Home and Small Office Wi-Fi (R) Networks, which is available from http://www.wi-fi.org/wp/wifi-protected-set-up; 2007, 2008, 2009 Wi-Fi Alliance, p. 1-14.

\* cited by examiner

*Primary Examiner* — Ronald B Abelson
(74) *Attorney, Agent, or Firm* — Canon USA, Inc., IP Division

(57) ABSTRACT

Even when a plurality of communication parameter providing devices exist, a communication parameter setting process is enabled. When a plurality of communication parameter providing devices exist, one of the communication parameter providing devices is determined. For example, all the communication parameter providing devices are caused to stop the providing process. Alternatively, a user is allowed to select a communication parameter providing device. Alternatively, a communication parameter providing device is determined in accordance with a predetermined rule.

21 Claims, 9 Drawing Sheets

Related U.S. Application Data

No. 13/254,899, filed as application No. PCT/JP2010/001503 on Mar. 4, 2010, now Pat. No. 8,660,031.

COMMUNICATION DEVICE, CONTROL METHOD THEREFOR, AND PROGRAM

CROSS-REFERENCE TO RELATED APPLICATION

This application is a Continuation of co-pending U.S. patent application Ser. No. 14/151,981, filed Jan. 10, 2014; which is a Continuation of co-pending U.S. patent application Ser. No. 13/254,899 filed Sep. 6, 2011, which is a National Phase application of International Application PCT/JP2010/001503, filed Mar. 4, 2010, which claims the benefit of Japanese Patent Application No. 2009-058268, filed Mar. 11, 2009, which is hereby incorporated by reference herein in its entirety.

TECHNICAL FIELD

The present invention relates to a communication device, a control method therefor, and a program.

BACKGROUND ART

In wireless communication such as wireless local area networks (LANs) based on the Institute of Electrical and Electronics Engineers (IEEE) 802.11 series of standards, there are a large number of setting items to be set before use.

Examples of the setting items include communication parameters necessary for wireless communication, such as a service set identifier (SSID) serving as a network identifier (ID), an encryption method, an encryption key, an authentication method, and an authentication key. It is troublesome for users to set all of them by manual input. Many manufacturers have developed automatic setting methods for easily setting communication parameters in wireless devices. The automatic setting methods allow automatic setting of communication parameters by providing the communication parameters from one device to another device using a predetermined procedure and using messages.

NPL 1 discloses a Wi-Fi Protected Setup (WPS), which is an industry standard specification for automatic setting of communication parameters between an access point (base station) and a station (terminal station). There are methods as follows to configure WPS: a push button method and a personal identification number (PIN) method. In the push button method, a button is pressed on both devices. In the PIN method, a predetermined PIN code is set in both the Registrar and the Enrollee and communication parameters are set between devices having matching PIN codes.

CITATION LIST

Patent Literature

[NPL 1] Wi-Fi CERTIFIED™ for Wi-Fi Protected Setup: Easing the User Experience for Home and Small Office Wi-Fi® Networks, which is available from http://www.wi-fi.org/wp/wifi-protected-setup

SUMMARY OF INVENTION

Technical Problem

In WPS, the roles of a device that provides a communication parameter (hereinafter referred to as a "providing device") and a device that receives the communication parameter (hereinafter referred to as a "receiving device") are determined in advance. Therefore, the transfer direction of the communication parameter is uniquely determined.

When a plurality of providing devices exist, it is difficult for a receiving device to determine a providing device from which a communication parameter is received. In this case, in the WPS push button method, upon detection of a plurality of providing devices, a receiving device terminates a WPS process. In the WPS PIN method, the receiving device handshakes with the providing devices in the order detected, and performs a WPS process with a providing device having a PIN that matches that of the receiving device. In a situation where a plurality of providing devices exist, therefore, it is not possible to perform an automatic communication parameter setting process using the push button method. Even the PIN method can require much time. Note that WPS does not specify the automatic setting of communication parameters in an ad-hoc mode.

When a plurality of providing devices are operating in different wireless LAN channels, the wireless LAN channels are limited in terms of accessibility by a receiving device to reduce the number of candidate providing devices. In a case where the providing devices are operating in the same channel, however, it is difficult to narrow down the candidates. In this case, even when one wireless LAN channel is determined, it is difficult to determine a providing device that provides a communication parameter and to automatically set a communication parameter.

Accordingly, the present invention enables the setting of a communication parameter even with the presence of a plurality of providing devices that are available to provide a communication parameter.

Solution to Problem

In an aspect of the present invention, a communication parameter providing device is searched for. When a plurality of communication parameter providing devices adapted to provide a communication parameter are detected, the plurality of communication parameter providing devices are caused to stop operating as communication parameter providing devices. Alternatively, a user is prompted to select one of the communication parameter providing devices, or the communication parameter providing devices themselves determine one of them in accordance with a predetermined rule.

Advantageous Effects of Invention

According to an aspect of the present invention, when a plurality of providing devices exist, the possibility of failure occurring in an automatic communication parameter setting process can be reduced.

DESCRIPTION OF EMBODIMENTS

First Embodiment

A communication device according to a first embodiment will be described in detail with reference to the drawings. In the following description, a wireless LAN system based on the IEEE 802.11 series of standards is used by way of example. However, a communication medium other than IEEE 802.11-based wireless LANs may be used.

A hardware configuration in an example in the embodiment will now be described.

Figure 1:
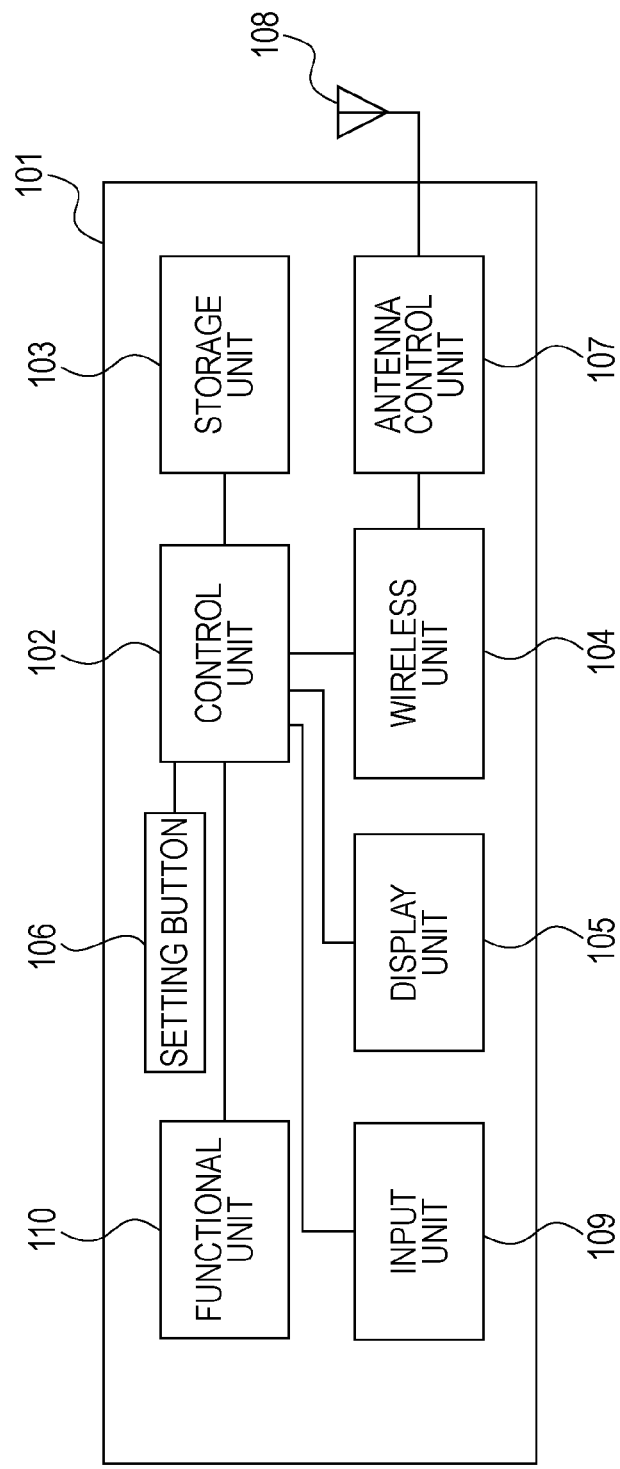
FIG. 1 is a block diagram of a device.

FIG. 1 is a block diagram illustrating an example configuration of each of devices described below. A device 101 includes a control unit 102, a storage unit 103, a wireless unit 104, a display unit 105, and a setting button 106. The control unit 102 controls the overall operation of the device 101 by executing a control program stored in the storage unit 103. The control unit 102 further controls the setting of a communication parameter with another device. The storage unit 103 stores the control program executed by the control unit 102, and various types of information such as communication parameters. The control program stored in the storage unit 103 is executed by the control unit 102 to perform operations described below.

The wireless unit 104 is configured to perform wireless LAN communication based on the IEEE 802.11 series of standards. The display unit 105 is configured to perform various kinds of display, and has a function for outputting visually recognizable information, such as the functionality of a liquid crystal display (LCD) or a light emitting diode (LED), or a function for outputting sound, such as the functionality of a speaker.

The setting button 106 triggers the start of an automatic communication parameter setting process. When the setting button 106 is operated, an automatic communication parameter setting process is started. Upon detection of an operation of the setting button 106 by a user, the control unit 102 performs a process described below.

The device 101 further includes an antenna control unit 107, an antenna 108, an input unit 109, and a functional unit 110. The input unit 109 allows a user to perform various types of input. When the device 101 is implemented as a digital camera, the functional unit 110 may serve as an image capturing unit. When the device 101 is implemented as a printer, the functional unit 110 may serve as a printing unit. When the device 101 is implemented as a mobile phone, the functional unit 110 may serve as a calling unit and a public wireless unit. The functional unit 110 may serve as any functional unit depending on the type of the device 101. The setting button 106 may be dedicated or shared with other function. For example, when the device 101 is implemented as a camera, the setting button 106 may be shared with a shutter button, a SET button used for various settings, and other buttons. When the device 101 is implemented as a printer, the setting button 106 may be shared with a reset button, a SET button used for various settings, and other buttons.

Figure 2:
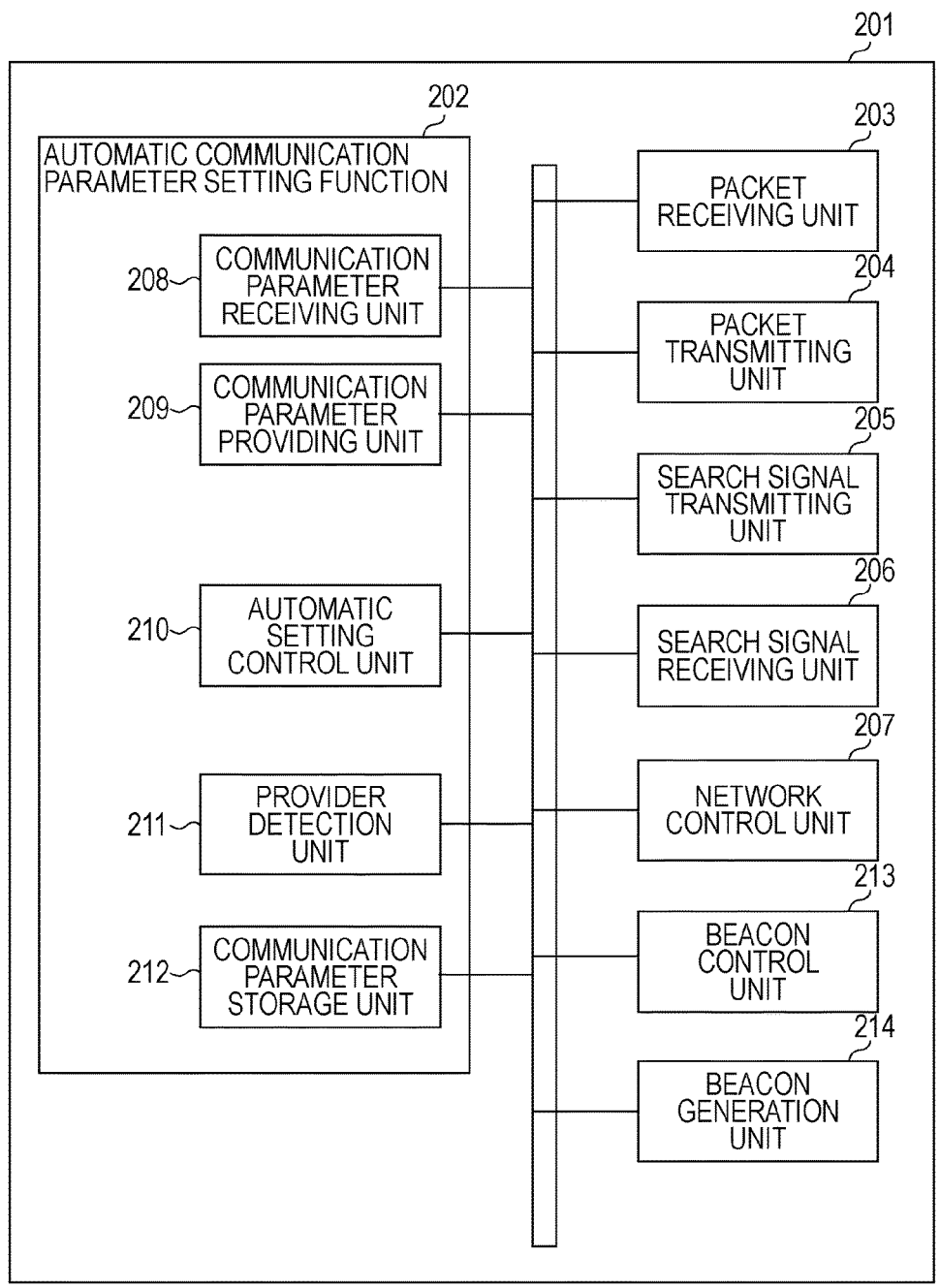
FIG. 2 is a block diagram of software functions in the device.

FIG. 2 is a block diagram illustrating an example configuration of software function blocks configured to execute an automatic communication parameter setting operation described below. Elements corresponding to the functional unit 110 illustrated in FIG. 1 are not illustrated.

A device 201 includes an automatic communication parameter setting function block 202. In the embodiment, the automatic communication parameter setting function block 202 is configured to automatically set communication parameters necessary for wireless LAN communication, such as an SSID serving as a network ID, an encryption method, an encryption key, an authentication method, and an authentication key. Automatic communication parameter setting is hereinafter referred to simply as "automatic setting".

A packet receiving unit 203 is configured to receive packets involved in various kinds of communication. A beacon (notification signal) is received by the packet receiving unit 203. A packet transmitting unit 204 is configured to transmit packets involved in various kinds of communication. A beacon is transmitted by the packet transmitting unit 204. Every beacon contains various kinds of information about the transmission source device.

A search signal transmitting unit 205 is configured to control the transmission of a device search signal such as a probe request. The probe request may also serve as a network search signal for searching for a desired network. A probe request is transmitted by the search signal transmitting unit 205. A probe response serving as a response signal to a received probe request is also transmitted by the search signal transmitting unit 205. In the embodiment, when a user operates the setting button 106 and starts an automatic setting process, an information element (IE) indicating that automatic setting is in progress (an automatic setting operation is currently being performed) is added to a beacon, a probe request, and a probe response before they are transmitted.

A search signal receiving unit 206 is configured to control the reception of a device search signal such as a probe request from another device. A probe request is received by the search signal receiving unit 206. A probe response is also received by the search signal receiving unit 206. Every device search signal and every response signal thereto contain various kinds of information about the transmission source device.

A network control unit 207 is configured to control network connections. A process for setting up a connection to a wireless LAN ad-hoc network or the like is performed by the network control unit 207.

The automatic setting function block 202 includes a communication parameter receiving unit 208, a communication parameter providing unit 209, and an automatic setting control unit 210. The communication parameter receiving unit 208 is configured to receive (accept) a communication parameter from a communication counterpart. The communication parameter providing unit 209 is configured to provide a communication parameter to a communication counterpart. The automatic setting control unit 210 is configured to control various protocols used for automatic setting. An automatic setting process described below is performed by the communication parameter receiving unit 208 and the communication parameter providing unit 209 under the control of the automatic setting control unit 210.

The automatic setting control unit 210 further determines whether or not the elapsed time since the start of the automatic setting process exceeds a time limit. When it is determined that the elapsed time exceeds the time limit, the automatic setting process is terminated under the control of the automatic setting control unit 210.

The automatic setting function block 202 further includes a provider detection unit 211 and a communication parameter storage unit 212. The provider detection unit 211 is configured to detect a device that provides a communication parameter (hereinafter referred to as a "providing device"). The provider detection unit 211 detects a providing device in accordance with a search signal transmitted and a response thereto, which are handled by the search signal transmitting unit 205 and the search signal receiving unit 206. The provider detection unit 211 can also detect a providing device in accordance with a beacon received by the packet receiving unit 203. In order to receive a communication parameter, a request for providing a communication parameter is sent to a detected providing device, and the communication parameter is provided therefrom. In the following description, a device that receives a communication parameter is referred to as a "receiving device".

The communication parameter storage unit 212 stores a communication parameter received from a providing device or a communication parameter provided to a receiving device. The communication parameter storage unit 212 corresponds to the storage unit 103. In the embodiment, when a communication parameter is received from another device, the communication parameter is stored in the storage unit 103 as a set parameter. In addition, when a communication parameter is provided to another device, the communication parameter is stored in the storage unit 103 as a set parameter. A set parameter stored in the storage unit 103 may be discarded when communication via a network established using the set parameter is completed. A set parameter may also be discarded at a predetermined time such as after the lapse of a certain period of time since the parameter is stored in the storage unit 103 or when the device power is turned off.

A beacon control unit 213 is configured to control the transmission timing of a beacon (notification signal). A beacon generation unit 214 generates a beacon. The generated beacon is transmitted from the packet transmitting unit 204 to a network.

All the functional blocks have correlation in software or hardware. The functional blocks described above are examples. A plurality of functional blocks may constitute a single functional block, or one of the functional blocks may be divided into blocks each achieving a plurality of functions.

Figure 3:
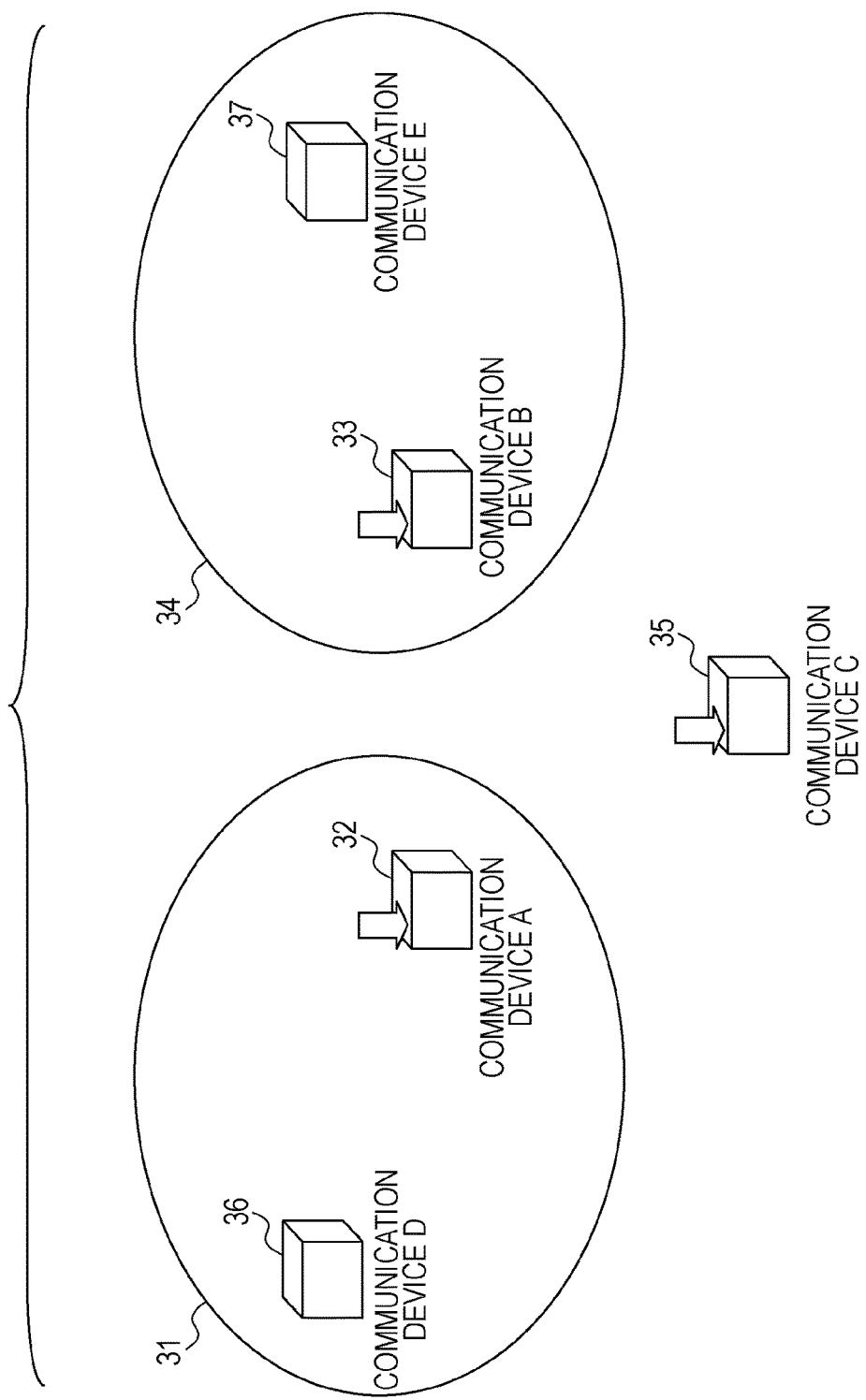
FIG. 3 is a network configuration diagram.

FIG. 3 is a diagram illustrating a communication device A 32 (hereinafter referred to as a "device A"), a communication device B 33 (hereinafter referred to as a "device B"), a communication device C 35 (hereinafter referred to as a "device C"), a communication device D 36 (hereinafter referred to as a "device D"), a communication device E 37 (hereinafter referred to as a "device E"), an ad-hoc network A 31 (hereinafter referred to as a "network A"), and an ad-hoc network B 34 (hereinafter referred to as a "network B"). Each of the above communication devices has the configuration described above with reference to FIG. 1 and FIG. 2.

It is assumed that the network A has already been established between the devices A and D using a communication parameter A shared between the devices A and D by performing an automatic setting process therebetween. In the automatic setting process performed between the devices A and D, it is assumed that the device A operates as a providing device and the device D operates as a receiving device.

It is also assumed that the network B has already been established between the devices B and E using a communication parameter B shared between by the devices B and E by performing an automatic setting process therebetween. In the automatic setting process performed between the devices B and E, it is assumed that the device B operates as a providing device and the device E operates as a receiving device.

Here, the networks A and B are different networks. The different networks may be networks whose basic service set identifiers (BSSIDs) serving as network IDs are different regardless of whether the wireless LAN channels are the same or different, or may be networks that have the same BSSID but use different wireless LAN channels. The term "wireless LAN channel" means a frequency channel.

In the embodiment, a description will be given of a case where the device B participating in the network B has accidentally started an automatic setting operation when automatic setting is to be performed between the device C and the device A participating in the network A in order to cause the device C to participate in the network A.

Figure 5:
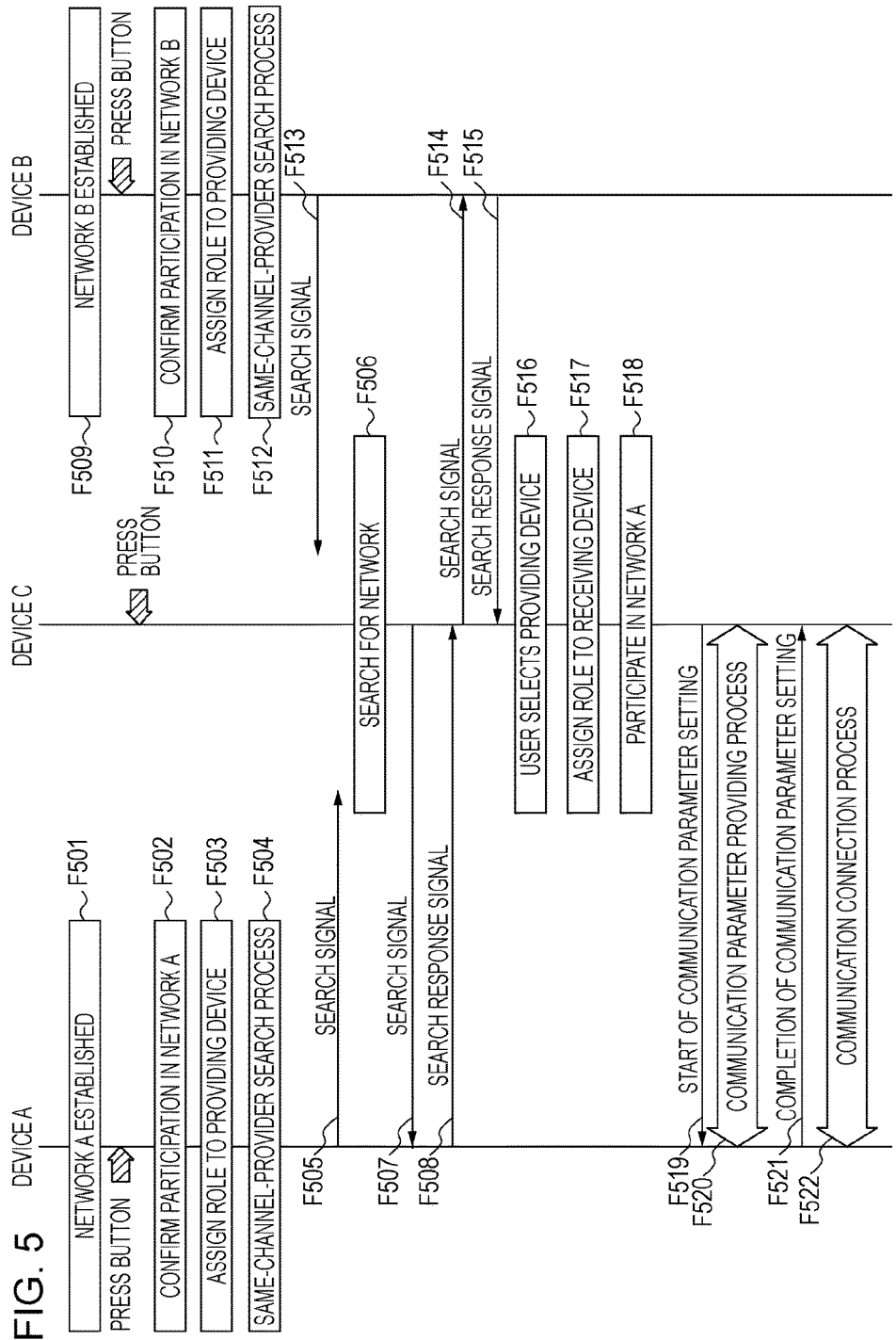
FIG. 5 is an operation sequence diagram of devices A, B, and C.

FIG. 5 is a diagram illustrating an example of a process sequence for performing an automatic setting process between the devices A, B, and C by pressing the setting buttons 106 thereof.

The device A has already established the network A with the device D using the communication parameter A set in the automatic setting process performed between the devices A and D (F501). The device B has already established the network B with the device E using the communication parameter B set in the automatic setting process performed between the devices B and E (F509).

When the setting buttons 106 of the respective devices are pressed, the device A confirms that it is participating in a network (F502). Since the device A is participating in a network, the device A assigns its role to "providing device" (F503). Thereafter, the device A searches for a providing device operating in the same wireless LAN channel (as the wireless LAN channel of the network A) (F504). In order to search for a providing device, the device A transmits a search signal (probe request) to the same wireless LAN channel (F505).

The device B performs an operation similar to that of the device A. Specifically, the device B confirms that it is participating in a network (F510). Since the device B is participating in a network, the device B assigns its role to "providing device" (F511). Then, the device B searches for a providing device operating in the same wireless LAN channel (as the wireless LAN channel of the network B) (F512). In order to search for a providing device, the device B transmits a search signal to the same wireless LAN channel (F513).

In contrast, since the device C is not participating in a network, the device C performs a network search process on a plurality of wireless LAN channels (F506). The wireless LAN channels to be searched may be all supported wireless LAN channels or may be a plurality of channels specified in advance by a user. The device C transmits a search signal to each of the channels (F507, F514). The search signal has an automatic setting function or includes an information element indicating an automatic setting process in progress.

When the device C searches through the channel on which the network A is operating, the device A transmits a search response signal to the device C (F508). Further, when the device C searches through the channel on which the network B is operating, the device B transmits a search response signal to the device C (F515). Like the search signal, the search response signal has an automatic setting function or includes an information element indicating an automatic setting process in progress. Since the devices A and B have assigned their role to "providing device" at this time point, each of the devices A and B transmits a search response signal including an information element indicating a providing device. Here, in addition to the information element indicating the role "providing device", an information element indicating "available to provide a communication parameter" may be added.

Consequently, the device C detects two providing devices that exist nearby, that is, the devices A and B. Upon detection of two providing devices that exist nearby, the device C displays on the display unit 105 a message for prompting a user to select one of the devices A and B with which the user performs an automatic communication parameter setting process. In accordance with a user operation of the input unit 109, the device C selects one of the devices A and B with which an automatic communication parameter setting process is performed (F516).

After the selection process described above is performed, the device C assigns its role to "receiving device" (F517). When it is determined in the selection process in F516 that an automatic communication parameter setting process is to be performed between the devices A and C, the device C participates in the network A (F518). Then, the devices A and C mutually transmit and receive communication messages (protocol messages) that are exchanged in the automatic communication parameter setting protocol process. Since communication parameters such as an encryption key and an authentication key have not yet been set in the device C at the time when the device C participates in the network A in F518, the device C is not allowed to perform normal data communication with the device A using encryption and authentication.

Here, the automatic communication parameter setting protocol process refers to a process for transmitting and receiving various communication messages determined in advance in order to provide a communication parameter from a providing device to a receiving device. In WPS, the above protocol process is termed a Registration protocol. In the embodiment, for ease of description, a process including the following procedures 1 to 3 is used as an automatic communication parameter setting protocol process:

1. A message indicating the start of the communication parameter setting process (a message for requesting the provision of a communication parameter) is transmitted from a receiving device to a providing device.
2. In response to the message, the providing device provides a communication parameter to the receiving device.
3. When the provision of the communication parameter is completed, a message indicating the completion of the communication parameter setting process is transmitted from the providing device to the receiving device.

When the device C participates in the network A, the device C transmits a message indicating the start of the communication parameter setting process to the device A (F519). In response to the message, a providing process for providing the communication parameter A from the device A to the device C is performed (F520). When the providing process is completed, the device A transmits a message indicating the completion of the communication parameter setting process to the device C (F521). Therefore, the communication parameter setting process is completed, and the communication parameter A is shared between the devices A and C.

Then, the devices A and C perform a communication connection process using the shared communication parameter A (F522). Automatically starting the communication connection process after the completion of the communication parameter setting process enables the devices A and C to communicate with each other without causing a user to perform an operation.

In the foregoing description, the device A is selected in the selection process in F516. As can be understood from the above, when a user selects the device B in F516, the process described with respect to F516 to F522 is performed between the devices B and C.

As described above, when a plurality of providing devices are detected, a message for prompting a user to select a providing device is displayed, and one of the providing devices with which an automatic communication parameter setting process is performed is selected in accordance with a user operation. However, a communication device may not necessarily be capable of selecting one of a plurality of providing devices because of its poor user interface capabilities.

Figure 6:
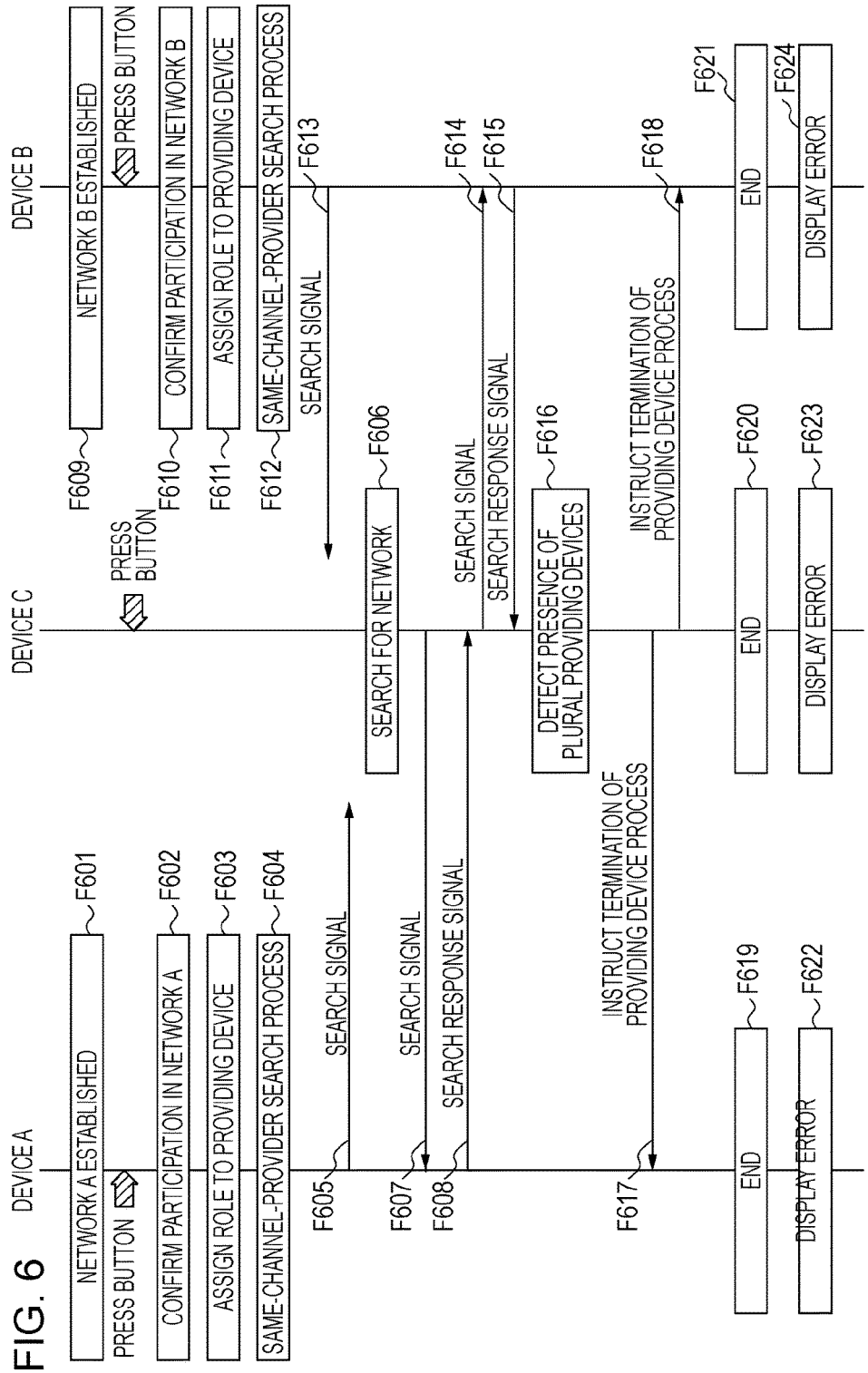
FIG. 6 is an operation sequence diagram of devices A, B, and C.

FIG. 6 illustrates an example of a sequence in the case of poor user interface capabilities of a communication device. The operations of F601 to F615 are similar to those of F501 to F515 illustrated in FIG. 5, respectively, and will not be discussed herein.

On the basis of the search response signal from the device A (F608) and the search response signal from the device B (F615), the device C detects two providing devices that exist nearby, that is, the devices A and B (F616). Due to the poor user interface capabilities, the device C is not capable of determining from which providing device to receive a communication parameter. Thus, the device C transmits an instruction signal including an instruction for terminating the process of the providing device to the devices A and B (F617, F618). Upon receipt of the instruction signal, each of the devices A and B terminates the automatic communication parameter setting process (F619, F621). The device C also terminates the automatic communication parameter setting process after the instruction signal is transmitted (F620). At this time, each of the devices A, B, and C displays an error screen indicating the termination of the automatic communication parameter setting process on the display unit 105 to notify the user (F622, F623, F624). Therefore, when a receiving device detects a plurality of providing devices from which the receiving device can receive a communication parameter, all the devices are caused to temporarily terminate their communication parameter setting process. Then, a user who recognizes the termination of the automatic setting process is prompted to restart the communication parameter setting process. In this case, the probability that both the devices A and B restart the automatic setting process is low and therefore, the automatic setting process can possibly be performed between the device C and a desired one of the devices A and B. In this manner, the communication parameter setting process performed by all the devices is temporarily stopped, and then the automatic setting process is attempted once again when one providing device is determined. This can prevent a user from receiving a communication parameter from an unintended providing device.

Figure 4:
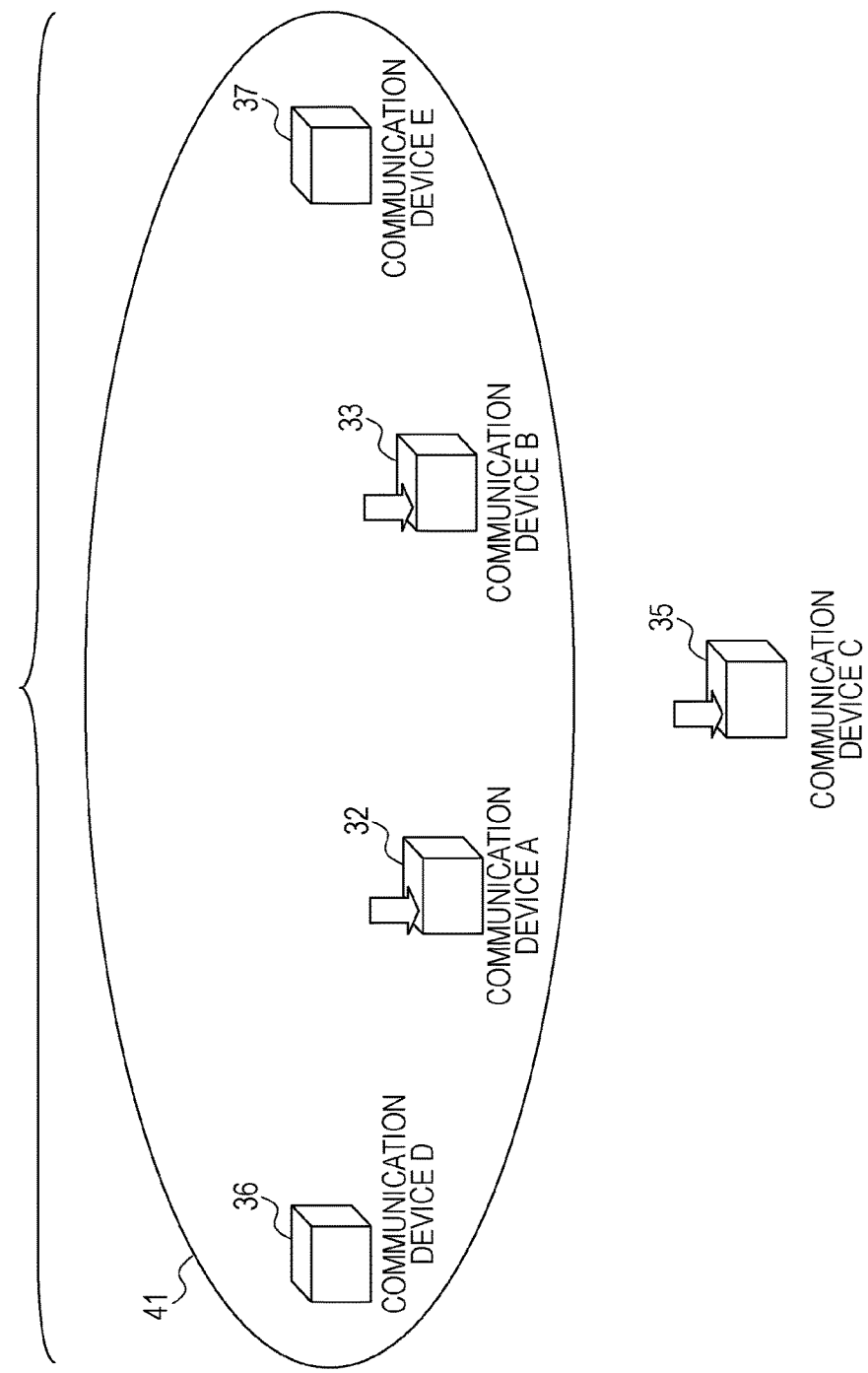
FIG. 4 is a network configuration diagram.

Next, a case where the networks A and B are the same will be described. A network configuration is illustrated in FIG. 4. FIG. 4 is a diagram illustrating the devices A, D, B, and E and an ad-hoc network 41 (hereinafter referred to as a "network A"). The network A has already been established, by performing an automatic setting process between the devices A, B, D, and E, using a communication parameter A shared between the device A and each of the remaining devices.

Figure 8:
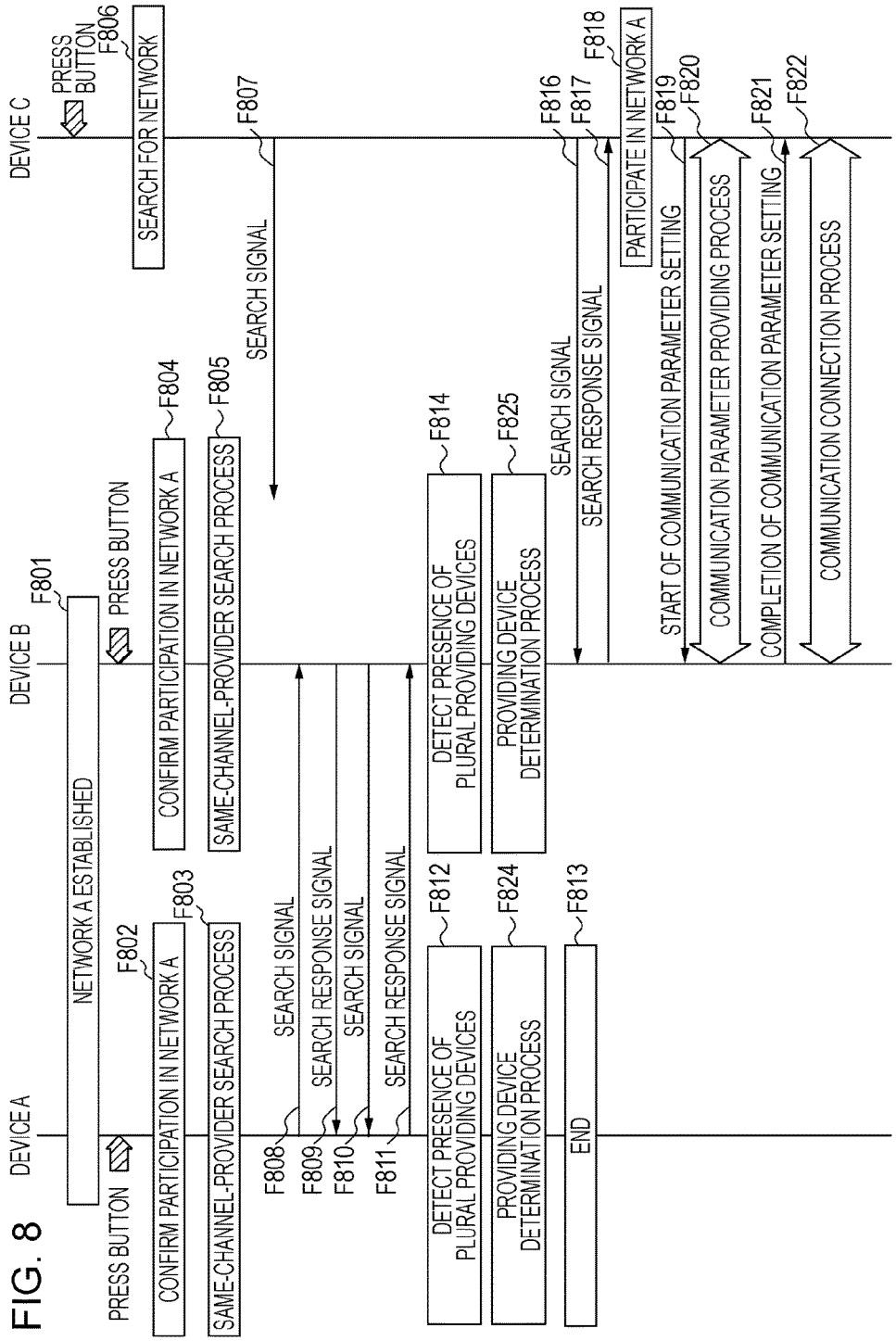
FIG. 8 is an operation sequence diagram of devices A, B, and C.

FIG. 8 is a diagram illustrating an example of a process sequence for performing an automatic setting process between the devices A, B, and C by pressing the setting buttons 106 thereof.

The devices A and B already established the network A using the communication parameter A set in the automatic setting process (F801). The device C has not yet established a network.

Here, the setting buttons 106 of the respective devices are pressed. First, the device A confirms that it is participating in a network (F802). Since the device A has already participated in the network A, the device A assigns its role to "providing device". Then, the device A searches for a providing device other than the device A through the wireless LAN channel in which the device A operates (F803). In order to search for a providing device, the device A transmits a search signal (probe request) to the wireless LAN channel in which the device A operates (F808). On the other hand, the device B is currently operating as a providing device because the setting button 106 thereof has been pressed. Therefore, in response to the search signal (F808), a search response signal (probe response) is transmitted from the device B to the device A (F809).

The device B performs an operation similar to that of the device A. Specifically, the device B confirms that it is participating in a network (F804). Since the device B has already participated in a network, the device B assigns its role to "providing device", and searches for another providing device through the same wireless LAN channel as that of the device B (F805). In order to search for a providing device, the device B transmits a search signal to the same wireless LAN channel (F810). Since the device A is currently operating as a providing device, a search response signal is transmitted from the device A to the device B (F811).

The above process allows the device A to recognize the presence of the device B and the device B to recognize the presence of the device A. In other words, each of the devices A and B detects the presence of a plurality of providing devices (F812, F814).

Upon detection of the presence of a plurality of providing devices, each of the devices A and B executes a predetermined process to determine which of them becomes the providing device in accordance with a predetermined standard (F824, F825). Examples of the predetermined standard may include the magnitude of a device identifier such as a media access control (MAC) address or universally unique identifier (UUID), where a device with a high identifier may become the providing device. The identifier may be part of the MAC address or UUID. Both the MAC address and UUID may also be used. Alternatively, communication devices may be compared in accordance with the types of the communication devices (such as a printer and a camera), the type of use, the type of power (such as battery or alternating current (AC) power), the performance of the communication devices such as the processing power of the central processing unit (CPU), or any other suitable standard. Furthermore, in order to determine a providing device, predetermined messages may be exchanged, and a providing device may be determined on the basis of the exchanged information. In the example illustrated in FIG. 8, by way of example, the device B becomes the providing device and the device A terminates the providing device process (F813).

In contrast, since the device C is not participating in a network, the device C performs a network search process on a plurality of wireless LAN channels (F806). The wireless LAN channels to be searched may be all wireless LAN channels supported by communication devices or may be a plurality of channels specified in advance by a user. The device C transmits a search signal to each of the channels (F807). The search signal may have an automatic setting function or include an information element indicating an automatic setting process in progress. The device C detects two providing devices that are present in the same network, that is, the devices A and B. Upon detection of a plurality of providing devices that are present in the same network, the device C waits for the providing devices themselves to determine one of them. The device C repeats a search for a predetermined period of time, and a search response signal is transmitted (F817) only from the device B when a search signal is transmitted (F816). Thus, it is determined that the device B is the providing device. The device C may also cancel the automatic setting process when two providing devices that are present in the same network are detected, as in a case where a plurality of providing devices are present in different networks or as in infrastructure mode WPS. In a case where the device C cancels the automatic setting process, a message for prompting a user to press the setting button 106 once again may be displayed on a user interface. At the time when the setting button 106 is pressed once again, a single providing device has already been determined by the devices A and B. When it is determined that the automatic communication parameter setting process is performed between the devices B and C, the device C participates in the network A (F818).

In the description of the embodiment, the setting buttons of the devices A, B, and C are pressed at substantially the same time. In a case where the time at which the button of the device C is pressed is later than that of the devices A and B, one providing device has already been determined at the time when the device C performs an automatic setting process. In this case, therefore, the process of waiting for one providing device to be determined and the process of canceling the process, which have been described above, are not performed.

Accordingly, the devices B and C mutually transmit and receive communication messages (protocol messages) that are exchanged in an automatic communication parameter setting protocol process. Since communication parameters such as an encryption key and an authentication key have not yet been set in the device C at the time when the device C participates in the network A in F818, the device C is not allowed to perform normal data communication with the device B using encryption and authentication. When the device C participates in the network A, the device C transmits a message indicating the start of the communication parameter setting process to the device B (F819). In response to the message, a providing process for providing the communication parameter A from the device B to the device C is performed (F820). When the providing process is completed, the device B transmits a message indicating the completion of the communication parameter setting process to the device C (F821). Therefore, the communication parameter setting process is completed, and the communication parameter A is shared between the devices B and C.

Then, the devices B and C perform a communication connection process using the shared communication parameter A (F822). Automatically starting the communication connection process after the completion of the communication parameter setting process enables the devices B and C to communicate with each other without causing a user to perform an operation.

Figure 9:
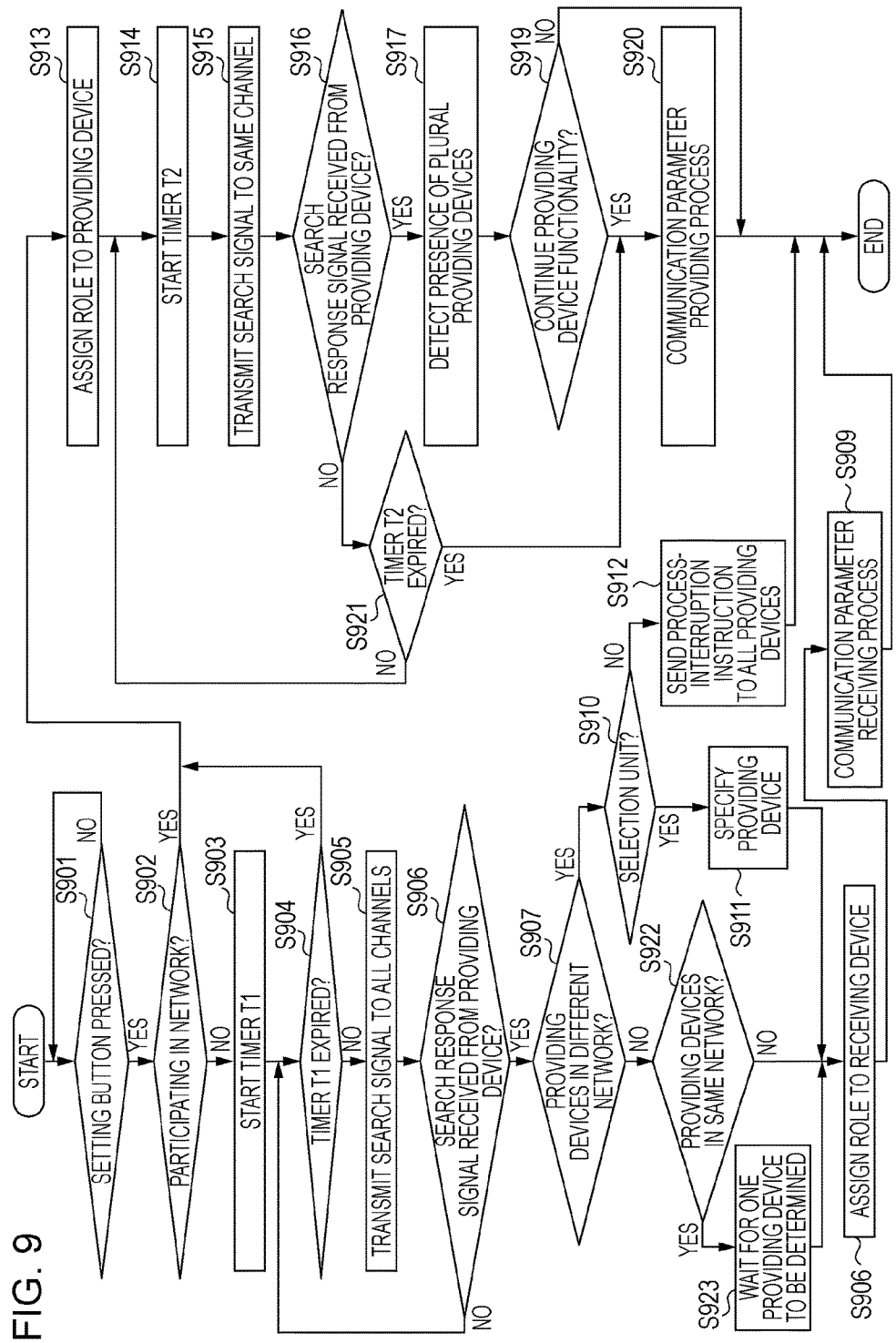
FIG. 9 is a flowchart of the operation of a communication device.

FIG. 9 is a flowchart illustrating an example of an operation flow of the devices A, B, and C. The operation illustrated in FIG. 9 is performed by the control unit 102 of each device by reading and executing the control program stored in the storage units 103. The control executed by each device will now be described in accordance with the flowchart illustrated in FIG. 9.

First, the device determines whether or not the setting button 106 has been pressed in order to instruct the start of the automatic setting process (S901). When it is determined that the setting button 106 has been pressed, the device determines whether or not it is participating in a network (S902).

When the device is not participating in a network, the device starts a timer T1 with a time limit for searching for a providing device (S903). The device determines whether or not the timer T1 has expired (S904). When the timer T1 has not expired, the device transmits a search signal (for example, a probe request) to all wireless LAN channels (S905). After the search signal is transmitted, it is determined whether or not a search response signal has been received from a providing device (S906). When no search response signal has been received from a providing device, the process returns to S904, and a search signal is repeatedly transmitted (S905) until the timer T1 has expired.

When a search response signal has been received from a providing device, the device determines whether or not a plurality of providing devices are present in different networks (S907). When a plurality of providing devices present in different networks are not detected, the device determines whether or not a plurality of providing devices are present in the same network (S922). When a single providing device is present in the same network, the communication device assigns its role to "receiving device" (S908), and performs a communication parameter receiving process (S909). Specifically, the communication device requests the providing device to start a communication parameter setting process, and receives a communication parameter from the providing device.

When it is determined in S922 that a plurality of providing devices are present in the same network, the device waits for one providing device to be determined as a result of arbitration of the providing devices (S923). Thereafter, when one providing device is determined, the communication device assigns its role to "receiving device" (S908), and performs a communication parameter receiving process (S909). The waiting processing of S923 may not necessarily be performed, and the process may be terminated when a plurality of providing devices in the same network are detected. In a case where the process is terminated, processes such as displaying a message indicating the termination of the process on the display unit 105 and prompting a user to press the setting button 106 once again may be performed. In this case, one providing device has possibly been determined at the time when the setting button 106 is pressed once again.

When a plurality of providing devices in different networks are detected in S907, it is determined whether or not the communication device has a selection unit for selecting one specific providing device among a plurality of providing devices (S910). When the communication device has a selection unit, a message for selecting a providing device is displayed, and a providing device from which a communication parameter is to be received is specified in accordance with a user operation (S911). After a providing device is specified, the communication device assigns its role to "receiving device" (S908) and performs a communication parameter receiving process (S909) by requesting the specified providing device to start a communication parameter setting process. This selection process corresponds to the operation of the device C described above with reference to FIG. 5.

When it is determined in S910 that the communication device does not have a selection unit, the communication device transmits an instruction signal for stopping the providing device process to all the detected providing devices (S912). The transmission of the instruction signal corresponds to the operation of the device C described above with reference to FIG. 6.

Even when it is determined in S910 that the communication device has a selection unit, the process may proceed to S912 instead of S911 depending on the intension of the user or the implementation of the communication device. Furthermore, the determination of S910 may be skipped and the processing of S911 or S912 may be performed. That is, when a plurality of providing devices in different networks are detected in S907, the communication device may display a message for selecting a providing device and specify a providing device from which a communication parameter is to be received in accordance with a user operation (S911). Furthermore, when a plurality of providing devices in different networks are detected in S907, the communication device may also transmit an instruction signal for stopping the providing device process to all the detected providing devices (S912).

Next, a process performed in a case where a communication device is participating in a network will be described. When it is determined in S902 that the communication device is participating in a network, the communication device assigns its role to "providing device" (S913), and starts a timer T2 with a time limit for searching for a providing device (S914).

Thereafter, the communication device transmits a search signal (probe request) to the wireless LAN channel in which the communication device operates (S915). After the search signal is transmitted, it is determined whether or not a search response signal (probe response) has been received from another providing device (S916). When no search response signal has been received from another providing device, the communication device determines whether or not the timer T2 has expired (S921). When the timer T2 has not expired, the process returns to S915 in order to perform a search process once again. When it is determined in S921 that the timer T2 has expired with no search response signal having been received from another providing device, it is determined that no other providing device is present in the same wireless LAN channel as that of the communication device, and a communication parameter providing process is started (S920).

When it is determined in S916 that a search response signal has been received from another providing device, it is determined that a plurality of providing devices are present (S917). Then, the communication device determines whether or not to continue the providing device process (S919). In this determination, first, it is determined whether or not a plurality of providing devices including the communication device are present in the same network. When another providing device is present in the same network, the communication device determines which of the communication device and the other providing device is to continue the providing device functionality in accordance with a predetermined standard. Examples of the predetermined standard may include the magnitude of a device identifier such as a MAC address or UUID, where a device with a high identifier may becomes the providing device. The identifier may be part of the MAC address or UUID. Both the MAC address and UUID may also be used. Alternatively, communication devices may be compared in accordance with the types of the communication devices (such as a printer and a camera), the type of use, the type of power (such as battery or AC power), the performance of the communication devices such as the processing power of the CPU, or any other suitable standard. Furthermore, in order to determine a providing device, predetermined messages may be exchanged, and a providing device may be determined on the basis of the exchanged information. When it is determined that the communication device continues the providing device process, the communication device serves as the providing device and performs a communication parameter providing process. Specifically, the communication device waits for a request of starting a communication parameter setting process. Upon receipt of the request, the communication device provides a communication parameter to a receiving device. When another providing device becomes the providing device, that is, when the communication device determines that the communication device does not perform the providing device process, the process ends.

When another providing device is present in a different network, upon receipt of a signal for starting a communication parameter setting process (F519) from a receiving device (the device C), the communication device continues the providing device process. Upon receipt of an instruction signal for stopping the providing device process (F617, F618), the communication device stops the providing device process. When the communication device is allowed to still operate as the providing device, the communication device continuously performs the communication parameter providing process (S920). In contrast, when the providing device process is stopped, the communication device terminates the automatic communication parameter setting process. In the processing of S919, only one of a plurality of providing devices is allowed to continuously operate as the providing device. However, all the devices may stop the providing device operation.

According to the foregoing description, an automatic communication parameter setting process can be prevented from failing due to the presence of a plurality of providing devices. Furthermore, even when a plurality of providing devices exist, a communication parameter received from any of the providing devices in the same network can be used to participate in the same network. A communication device can receive a communication parameter from any of the providing devices, and can participate in a network.

Second Embodiment

A second embodiment will be described with respect to an example in which when, as in the first embodiment, the networks A and B are different networks and when the wireless LAN channels are the same, a providing device is automatically determined.

Figure 7:
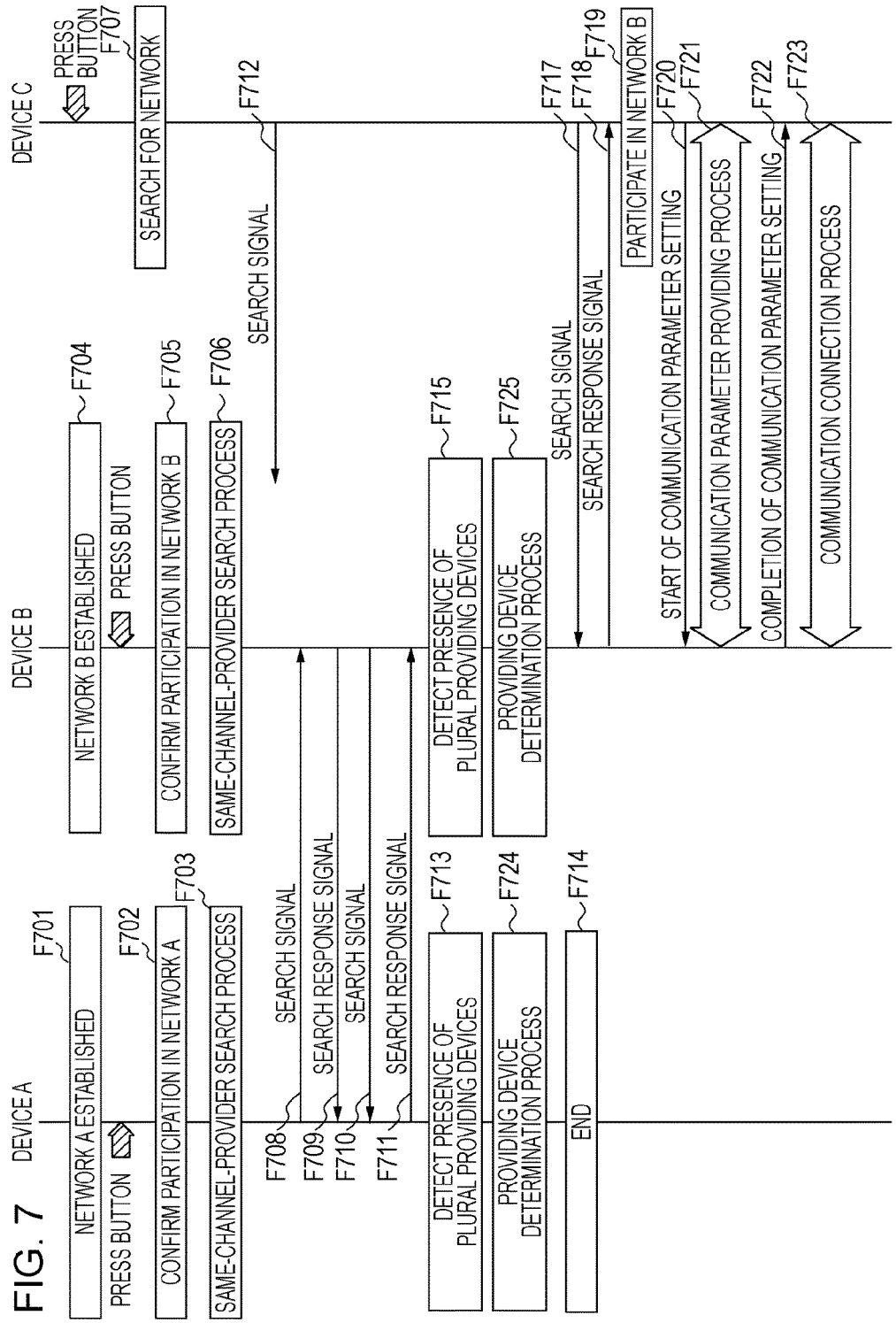
FIG. 7 is an operation sequence diagram of devices A, B, and C.

FIG. 7 is a diagram illustrating an example of a process sequence for performing an automatic setting process between the devices A, B, and C by pressing the setting buttons 106 thereof.

The device A has already established the network A with the device D using the communication parameter A set in the automatic setting process performed between the devices A and D (F701). The device B has already established the network B with the device E using the communication parameter B set in the automatic setting process performed between the devices B and E (F704). The device C has not yet established a network.

Here, the setting buttons 106 of the respective devices are pressed. First, the device A confirms that it is participating in a network (F702). Since the device A has already participated in the network A, the device A assigns its role to "providing device". Then, the device A searches for a providing device other than the device A through the wireless LAN channel in which the device A operates (F703). In order to search for a providing device, the device A transmits a search signal (probe request) to the wireless LAN channel in which the device A operates (F708). On the other hand, the device B is currently operating as a providing device because the setting button 106 thereof has been pressed. Therefore, in response to the search signal (F708), a search response signal (probe response) is transmitted from the device B to the device A (F709).

The device B performs an operation similar to that of the device A. Specifically, the device B confirms that it is participating in a network (F705). Since the device B has already participated in a network, the device B assigns its role to "providing device", and searches for another providing device through the same wireless LAN channel as that of the device B (F706). In order to search for a providing device, the device B transmits a search signal to the same wireless LAN channel (F710). Since the device A is currently operating as a providing device, a search response signal is transmitted from the device A to the device B (F711).

The above process allows the device A to recognize the presence of the device B and the device B to recognize the presence of the device A. In other words, each of the devices A and B detects a plurality of providing devices operating in the same wireless LAN channel (F713, F715). Upon detection of the presence of a plurality of providing devices, each of the devices A and B executes a predetermined process to determine which of them becomes the providing device in accordance with a predetermined standard (F724, F725). Examples of the predetermined standard may include the magnitude of a device identifier such as a MAC address or UUID, where a device with a high identifier may become the providing device. The identifier may be part of the MAC address or UUID. Both the MAC address and UUID may also be used. Alternatively, communication devices may be compared in accordance with the types of the communication devices (such as a printer and a camera), the type of use, the type of power (such as battery or AC power), the performance of the communication devices such as the processing power of the CPU, or any other suitable standard. Furthermore, in order to determine a providing device, predetermined messages may be exchanged, and a providing device may be determined on the basis of the exchanged information. In the example illustrated in FIG. 7, by way of example, the device B becomes the providing device and the device A terminates the providing device process (F714).

In contrast, since the device C is not participating in a network, the device C performs a network search process on a plurality of wireless LAN channels (F707). The wireless LAN channels to be searched may be all wireless LAN channels supported by communication devices or may be a plurality of channels specified in advance by a user. The device C transmits a search signal to each of the channels (F712). The search signal may have an automatic setting function or include an information element indicating an automatic setting process in progress.

The device C detects two providing devices operating in the same channel, that is, the devices A and B. Since a plurality of providing devices are operating in the same channel, the device C waits for the providing devices themselves to determine one of them. The device C repeats a search for a predetermined period of time, and a search response signal is transmitted (F718) only from the device B when a search signal is transmitted (F717). Thus, it is determined that the device B is the providing device.

The device C may also cancel the automatic setting process when two providing devices operating in the same channel are detected, as in a case where a plurality of providing devices are operating in different channels or as in infrastructure mode WPS. In a case where the device C cancels the automatic setting process, a message for prompting a user to press the setting button 106 once again may be displayed on a user interface. When the setting button 106 is pressed once again, a single providing device has been determined by the devices A and B.

When it is determined that the automatic communication parameter setting process is performed between the devices B and C in response to the search response signal (F718), the device C participates in the network B (F719).

In the description of the embodiment, the setting buttons of the devices A, B, and C are pressed at substantially the same time. In a case where the time at which the button of the device C is pressed is later than that of the devices A and B, one providing device has already been determined at the time when the device C performs an automatic setting process. In this case, therefore, the process of waiting for one providing device to be determined and the process of canceling the process, which have been described above, are not performed.

Accordingly, the devices B and C mutually transmit and receive communication messages (protocol messages) that are exchanged in an automatic communication parameter setting protocol process. Since communication parameters such as an encryption key and an authentication key have not yet been set in the device C at the time when the device C participates in the network B in F719, the device C is not allowed to perform normal data communication with the device B using encryption and authentication. When the device C participates in the network B, the device C transmits a message indicating the start of the communication parameter setting process to the device B (F720). In response to the message, a providing process for providing the communication parameter B from the device B to the device C is performed (F721). When the providing process is completed, the device B transmits a message indicating the completion of the communication parameter setting process to the device C (F722). Therefore, the communication parameter setting process is completed, and the communication parameter B is shared between the devices B and C.

Then, the devices B and C perform a communication connection process using the shared communication parameter B (F723). Automatically starting the communication connection process after the completion of the communication parameter setting process enables the devices B and C to communicate with each other without causing a user to perform an operation.

In order to perform the operation illustrated in FIG. 7, instead of performing the processing of S907 illustrated in FIG. 9, each of the devices A and B determines whether or not a plurality of providing devices are operating in different channels. When a plurality of providing devices are detected in the determination, the process proceeds to S910, or proceeds to S911 or S912. When a plurality of providing devices are not operating in different channels, instead of performing the processing of S922, it is determined whether or not a plurality of providing devices are operating in the same channel. When a plurality of providing devices are operating in the same channel, the process proceeds to S923.

According to the embodiment, therefore, even in a case where providing devices are present indifferent networks, when they are operating in the same channel, a providing device is automatically determined. This allows a receiving device to receive a communication parameter from any of the providing devices.

Furthermore, in S919 illustrated in FIG. 9, the communication device determines whether or not a plurality of providing devices including the communication device exist. When another providing device exists, the communication device determines which of the communication device and the other providing device is to continue the providing device functionality in accordance with a predetermined standard. Examples of the predetermined standard may include the magnitude of a device identifier such as a MAC address or UUID, where a device with a high identifier may become the providing device. The identifier may be part of the MAC address or UUID. Both the MAC address and UUID may also be used. Alternatively, communication devices may be compared in accordance with the types of the communication devices (such as a printer and a camera), the type of use, the type of power (such as battery or AC power), the performance of the communication devices such as the processing power of the CPU, or any other suitable standard. Furthermore, in order to determine a providing device, predetermined messages may be exchanged, and a providing device may be determined on the basis of the exchanged information. When it is determined that the communication device continues the providing device process, the communication device serves as the providing device and performs a communication parameter providing process. Specifically, the communication device waits for a request of starting a communication parameter setting process. Upon receipt of the request, the communication device provides a communication parameter to a receiving device. When another providing device becomes the providing device, that is, when the communication device does not perform the providing device process, the process ends. In the determination of S919, therefore, a providing device determination process is performed when a plurality of providing devices exist, without determining whether or not the plurality of providing devices are in the same network.

According to the embodiment, also, an automatic communication parameter setting process can be prevented from failing when a plurality of providing devices exist. In addition, even in a case where the providing devices are in different networks, when they are operating in the same wireless LAN channel, one of the providing devices can detect the other providing device or devices. Therefore, the providing devices can determine which providing device is to continue the process.

According to an embodiment of the present invention, therefore, when a plurality of providing devices exist, the possibility of failure of the automatic setting of communication parameters can be reduced. Even when a plurality of providing devices exist, a user can possibly receive a communication parameter from a desired providing device. Furthermore, even when the providing devices are in the same network, a communication parameter received from any of them can be used to participate in the same network.

A communication device can receive a communication parameter from any of the providing devices, and can participate in a network.

In the foregoing description, a providing device is searched for using active scan with a search signal and a search response signal. Alternatively, a passive scan in which a device searches for a providing device while waiting for a beacon to be received may be used. A combination of active scan and passive scan may also be used to search for a providing device.

The foregoing description has been given in the context of an IEEE 802.11 based wireless LAN, by way of example. However, the present invention may also be implemented using other wireless media such as wireless universal serial bus (USB), Multi Band Orthogonal Frequency Division Multiplexing (OFDM) Alliance (MBOA), Bluetooth (registered trademark), Ultra Wide Band (UWB), and ZigBee. The present invention may also be implemented using wired communication media such as a wired LAN. UWB includes wireless USB, wireless 1394, and WiMedia Network (WiNET). Furthermore, a communication parameter has been described in the context of a network identifier, an encryption method, an encryption key, an authentication method, or an authentication key, by way of example. However, it is to be understood that other information may be used and other information may be included in a communication parameter.

A recording medium storing program code of software implementing the functions described above may be supplied to a system or a device, and a computer (CPU or a microprocessing unit (MPU)) of the system or device may read and execute the program code stored in the recording medium, thereby implementing an embodiment of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A communication device comprising:
    a determination unit configured to determine whether the communication device participates in a wireless network;
    a first transmission unit configured to transmit a search signal having a setting function to a plurality of channels in a case where the communication device does not participate in the wireless network;
    a second transmission unit configured to transmit, on a part of the plurality of channels and where the communication device belongs, the search signal in a case where the communication device participates in the wireless network; and
    an execution unit configured to execute, with another communication device which has responded to the search signal, a setting process of a communication parameter.

2. The communication device according to claim 1, further comprising:
    a control unit configured to control the communication device to operate as a providing device that provides the communication parameter in a case where the determination unit has determined that the communication device participates in the wireless network.

3. The communication device according to claim 1, further comprising:
    a detection unit configured to detect a predetermined user operation,
    wherein, in a case where the detection unit has detected the predetermined user operation, the determination unit determines whether the communication device participates in the wireless network.

4. The communication device according to claim 1, further comprising:
    a decision unit configured to decide, based on a predetermined condition, whether the setting process of the communication parameter is to be executed, in a case where the determination unit has determined that the communication device does not participate in the wireless network.

5. The communication device according to claim 1, wherein the communication parameter includes at least one of a network identifier, an encryption method, an encryption key, an authentication method, and an authentication key.

6. The communication device according to claim 1, wherein the execution unit executes the setting process of the communication parameter according to a procedure based on a Wi-Fi Protected Setup (WPS).

7. The communication device according to claim 1, wherein the setting function indicates the setting process is in progress.

8. A method comprising:
    determining whether a communication device participates in a wireless network;
    transmitting a search signal having a setting function to a plurality of channels in a case where the communication device does not participate in the wireless network;
    transmitting, to a part of the plurality of channels and where the communication device belongs, the search signal in a case where the communication device participates in the wireless network; and
    executing, with another communication device which has responded to the search signal, a setting process of a communication parameter.

9. The method according to claim 8, further comprising:
    providing the communication parameter in a case where the communication device participates in the wireless network.

10. The method according to claim 8, further comprising:
    detecting a predetermined user operation,
    wherein, in a case where the detecting has detected the predetermined user operation, the determining determines whether the communication device participates in the wireless network.

11. The method according to claim 8, further comprising:
    deciding, based on a predetermined condition, whether the setting process of the communication parameter is to be executed, in a case where the determining has determined that the communication device does not participate in the wireless network.

12. The method according to claim 8, wherein the communication parameter includes at least one of a network identifier, an encryption method, an encryption key, an authentication method, and an authentication key.

13. The method according to claim 8, wherein the executing executes the setting process of the communication parameter according to a procedure based on a Wi-Fi Protected Setup (WPS).

14. The method according to claim 8, wherein the setting function indicates the setting process is in progress.

15. A computer readable storage medium storing a computer-executable program of instructions for causing a computer to perform a method comprising:

determining whether a communication device participates in a wireless network;

transmitting a search signal having a setting function to a plurality of channels in a case where the communication device does not participate in the wireless network;

transmitting, on a part of the plurality of channels and where the communication device belongs, the search signal in a case where the communication device participates in the wireless network; and executing, with another communication device which has responded to the search signal, a setting process of a communication parameter.

16. The computer readable storage medium according to claim 15, further comprising:

detecting a predetermined user operation, wherein, in a case where the detecting has detected the predetermined user operation, the determining determines whether the communication device participates in the wireless network.

17. The computer readable storage medium according to claim 15, further comprising:

providing the communication parameter in a case where the communication device participates in the wireless network.

18. The computer readable storage medium according to claim 15, further comprising:

deciding, based on a predetermined condition, whether the setting process of the communication parameter is to be executed, in a case where the determining has determined that the communication device does not participate in the wireless network.

19. The computer readable storage medium according to claim 15, wherein the communication parameter includes at least one of a network identifier, an encryption method, an encryption key, an authentication method, and an authentication key.

20. The computer readable storage medium according to claim 15, wherein the executing executes the setting process of the communication parameter according to a procedure based on a Wi-Fi Protected Setup (WPS).

21. The computer readable storage medium according to claim 15, wherein the setting function indicates the setting process is in progress.

* * * * *